United States Patent Office 2,722,712
Patented Nov. 8, 1955

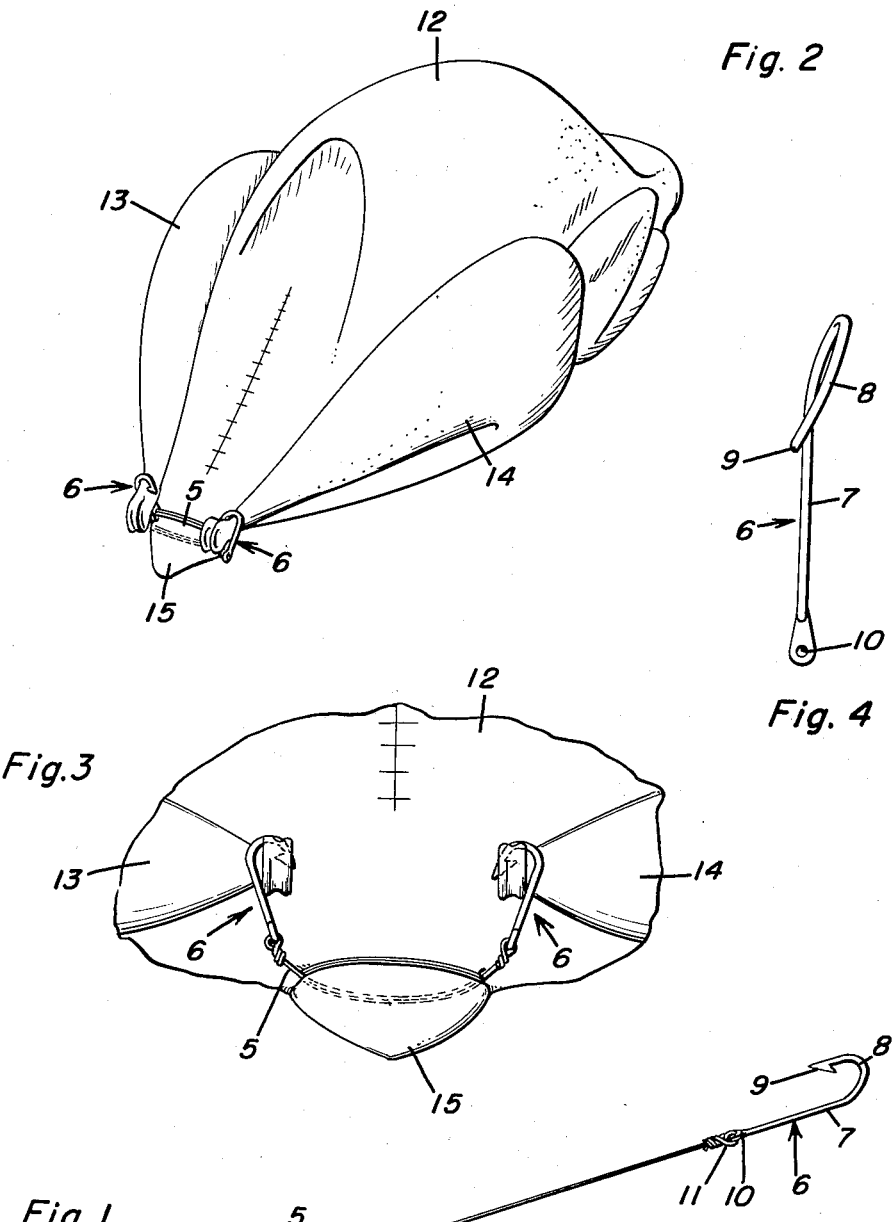

2,722,712

POULTRY LEG HOLDER

William H. Rabé, Salinas, Calif., assignor of fifty per cent to Ruth Rabé, Salinas, Calif.

Application February 15, 1954, Serial No. 410,331

1 Claim. (Cl. 17—11)

The present invention relates to new and useful improvements in poultry trusses and has for its primary object to provide, in a manner as hereinafter set forth, an appliance of this character comprising a novel construction whereby the legs may be expeditiously bound tightly adjacent the tail of the fowl while it is being roasted.

Another very important object of the invention is to provide a poultry truss of the aforementioned character which may be readily removed when desired and reused.

Other objects of the invention are to provide a poultry leg truss which will be comparatively simple in construction, strong, durable, sanitary and which may be manufactured at low cost.

All of the foregoing and still further objects and advantages of the invention will become apparent from a study of the following specification, taken in connection with the accompanying drawing wherein like characters of reference designate corresponding parts throughout the several views and wherein:

Figure 1 is a perspective view of a poultry truss embodying the present invention.

Figure 2 is a perspective view, showing the device in use.

Figure 3 is a rear elevational view, showing the device in use.

Figure 4 is an elevational view of one of the hooks.

Referring now to the drawing in detail, it will be seen that the embodiment of the invention which has been illustrated comprises a wire strand 5 of suitable resilient metal, which strand may be of any desired length and gauge. Mounted on the ends of the resilient wire strand 5 is a pair of oppositely facing hooks 6.

In the embodiment shown, the hooks 6 include metallic shanks 7 and integral, twisted bills 8 which terminate in blunt, barbed free ends 9. The free end portions of the shanks 7 of the hooks 6 are flattened and apertured to provide eyes or the like 10. The eyes 10 fit tightly in loops 11 on the ends of the resilient wire strand 5 for connecting the hooks 6 thereto.

It is thought that the manner in which the device is used will be readily apparent from a consideration of the foregoing. In Figures 2 and 3 of the drawing, reference character 12 designates a fowl which is ready to be roasted, said fowl having legs 13 and 14, the tail 15, etc. Briefly, one of the hooks 6 is slipped over the leg 13 until the barb 9 of said hook catches. Holding the leg 13 close to the body of the fowl and in a down position, the resilient wire strand 5 is passed under the tail 15 of the fowl and wound tightly therearound as many loops as may be necessary to shorten said strand and tighten the leg 13. Then, the other hook 6 is slipped on the leg 14 of the fowl until the barb 9 thereon catches, this last step being taken while holding the leg 14 tightly to the body of the fowl and in a downward position. The construction and arrangement of parts is such that the oppositely facing, twisted and barbed hooks 6 grip the legs of the fowl and are firmly but removably anchored thereto.

It is believed that the many advantages of a poultry leg truss constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

A poultry truss for trussing legs of poultry being cooked comprising a single unobstructed readily deformable resilient wire portion having at least one loop portion engageable tightly around the tail of a fowl, and a pair of oppositely facing leg engaging hooks fixed on opposite end portions of said wire and engageable under tension on opposite legs of a fowl, by twisting the wire with the legs of the fowl from the outer sides thereof for securing the legs in a position adjacent to and substantially parallel with the body of a fowl, said hooks including barbed bills engageable with the legs of said fowl for anchoring said hooks in said legs.

References Cited in the file of this patent

UNITED STATES PATENTS

| | | |
|---|---|---|
| 1,091,085 | Roucher | Mar. 24, 1914 |
| 1,633,499 | Selden | June 21, 1927 |
| 2,162,739 | Mindek, Jr. | June 20, 1939 |
| 2,234,588 | Cope | Mar. 11, 1941 |